United States Patent
Donohue et al.

(10) Patent No.: US 12,365,145 B2
(45) Date of Patent: Jul. 22, 2025

(54) MESH TO FLEXIBLE SCREEN FRAME LAMINATOR

(71) Applicant: Erdman Automation Corporation, Princeton, MN (US)

(72) Inventors: Morgan William Donohue, North Oaks, MN (US); Ryan Lloyd Henry Roberts, Isanti, MN (US); Larry Berning, Buffalo, MN (US); Dale James Hatch, Milaca, MN (US); Evan Garrett, Henderson, NV (US); Andrew Dean Peterson, Zimmerman, MN (US); Peter Joachim Kroll, Saint Stephen, MN (US)

(73) Assignee: Erdman Automation Corporation, Princeton, MN (US)

( * ) Notice: Subject to any disclaimer, the term of this patent is extended or adjusted under 35 U.S.C. 154(b) by 248 days.

(21) Appl. No.: 18/189,661

(22) Filed: Mar. 24, 2023

(65) Prior Publication Data
US 2024/0316876 A1    Sep. 26, 2024

(51) Int. Cl.
*B29C 65/20* (2006.01)
*B29C 65/68* (2006.01)
(Continued)

(52) U.S. Cl.
CPC .............. *B29C 65/20* (2013.01); *B29C 65/68* (2013.01); *B29C 65/78* (2013.01); *B29L 2031/724* (2013.01); *B29L 2031/778* (2013.01)

(58) Field of Classification Search
CPC ......... B29C 65/20; B29C 65/68; B29C 65/78; B29C 65/7861; B29C 66/83413
See application file for complete search history.

(56) References Cited

U.S. PATENT DOCUMENTS

| | | | |
|---|---|---|---|
| 4,243,464 A * | 1/1981 | Potchen | B29C 63/02 156/324 |
| 6,331,223 B1 * | 12/2001 | Wylie | E06B 9/52 160/371 |

(Continued)

FOREIGN PATENT DOCUMENTS

| | | |
|---|---|---|
| CA | 180236 S | 11/2019 |
| CA | 180238 S | 11/2019 |

(Continued)

OTHER PUBLICATIONS

T300 Edge, Hot Wedge Welding, https://www.weldmaster.com/t300-extreme-edge.

(Continued)

*Primary Examiner* — Daniel McNally
(74) *Attorney, Agent, or Firm* — DeWitt LLP

(57) ABSTRACT

A mesh to flexible screen frame laminator includes a first table with a horizontal surface and an alignment fence, a second table that is lower than the first table and a first pair of selectively driven heater rollers which are shiftable between a raised position and a lowered position relative to the first table. A cradle is located adjacent the first table and above the second table and at least a portion of the cradle is shiftable between a raised position and a lowered position, the raised position being substantially coplanar with the first table. A second pair of selectively driven heater rollers is shiftable between a raised position and a lowered position relative to the second table and is oriented transversely to the first pair of heater rollers. A third table is located adjacent the second table and at a height substantially coplanar with the second table.

20 Claims, 11 Drawing Sheets

(51) Int. Cl.
  *B29C 65/78* (2006.01)
  *B29L 31/00* (2006.01)

(56) References Cited

U.S. PATENT DOCUMENTS

| | | |
|---|---|---|
| 7,572,299 B2 | 8/2009 | Christensen |
| 9,234,388 B2 | 1/2016 | Altieri, Jr. |
| D757,299 S | 5/2016 | Altieri, Jr. |
| D794,830 S | 8/2017 | Altieri, Jr. |
| D850,652 S | 6/2019 | Altieri, Jr. |
| D961,803 S | 8/2022 | Altieri, Jr. |
| 2016/0090780 A1 | 3/2016 | Altieri, Jr. |
| 2020/0232274 A1 | 7/2020 | Altieri, Jr. |
| 2022/0056760 A1 | 2/2022 | Altieri, Jr. |
| 2022/0298856 A1 | 9/2022 | Altieri, Jr. |

FOREIGN PATENT DOCUMENTS

| | | |
|---|---|---|
| WO | WO2020150602 A1 | 7/2020 |
| WO | WO 2020247951 A1 | 12/2020 |
| WO | WO 2022183129 A1 | 9/2022 |

OTHER PUBLICATIONS

T300 Shade, Hot Air Welding, Hot Wedge Welding, https://www.weldmaster.com/t300-extreme-shade.
Meridian Screen Machine Spadix Technologies—Meridian, www.spadixtechnologies.com/products/meridian, 2 pages, prior to Mar. 24, 2023.

* cited by examiner

MESH TO FLEXIBLE SCREEN FRAME LAMINATOR

TECHNICAL FIELD

Embodiments of the invention relate generally to removable window and door screens. In particular, example embodiments of the invention relate to the manufacturing of removable window screens that include a flexible frame that is resilient and a flexible mesh material that is bonded to the flexible frame.

BACKGROUND

Fenestrations exist in buildings to permit ingress and egress, entry of fresh air and light. Screens have been used in these openings for many years to permit the entry and exit of air while excluding insects, debris, leaves and other undesired materials. Currently screens generally include a mesh material supported by a frame that holds the mesh material taut and facilitates insertion of the screen into the frame of a fenestration. For the purposes of this application, the term fenestration refers to any opening in the outside envelope of a building structure including but not limited to windows and doors.

In many modern window screens a fiberglass mesh is supported in a frame. Other mesh materials commonly include nylon, polyester, bronze, stainless steel, aluminum, copper, brass and galvanized steel. Meshes made of fiberglass, nylon and polyester are generally quite flexible, while meshes that are made of stainless steel, aluminum, copper, brass and galvanized steel are relatively less flexible.

Screen frames are commonly made of rigid materials such as extruded aluminum, wood, steel or polymers. Occasionally, screens are made without a perimeter frame. In this case the screens are stretched taut over an opening often by a roller under spring tension.

More recently, other screen frames are made of flexible materials with resilient qualities. For example, some flexible screen frames are made from resilient steel that is coated with a polymer material. In many cases, the screen mesh is fused to the flexible screen frame by the application of heat which renders the polymer material of the screen frame, the screen mesh or both at least partially molten during the manufacturing of the screen. When the polymer material returns to its non-molten state the screen mesh is fused and strongly bound to the screen frame.

Such flexible screens are typically inserted into rigid fenestration frames by distorting the flexible window screen, generally by pushing inwardly on parallel rectilinear sides of the flexible window screen and then inserting the flexible window screen into grooves that surround the rigid fenestration frame on an inside of the fenestration frame. Similarly, flexible screens are generally removed by distorting the screen frame which then permits taking the screen frame out of the grooves. To facilitate this, the flexible screen frame is generally resiliently biased outwardly toward an approximately rectangular shape.

Currently, manufacturing of flexible window screen frames and flexible window screens is largely done by manual processes that are labor-intensive. These processes tend to be inefficient and time-consuming. Thus, rapid production of flexible screen frames and screens is not available.

Flexible screen frames are formed from spring metal such as spring steel that is bent to the shape of the screen and so that terminal ends of the metal material abut one another. Generally, the abutting ends of the flexible screen frame are located away from corners of the frame but not at a center of a straight side of the screen frame. The spring material is coated with a polymer material such as polyvinylchloride (PVC) also referred to as vinyl. Other polymer material coatings are, of course, possible.

Flexible screen frames are formed of spring material so that they can be deformed inwardly, inserted into a window frame and then be held in place by the resilience of the flexible screen frame material springing outwardly. Deformation of the flexible screen frame is generally accomplished by pressing inwardly on two opposing straight sides of the screen frame.

The abutting terminal ends of the shaped frame are welded to each other to form a closed geometric shape most commonly a rectangle or a square. Resistance welding is commonly used.

To facilitate the welding of the abutting ends of the frame, the polymer coating material must first be removed from the metal core material. Failure to remove the polymer material interferes with establishing electrical contact with the metal core of the frame material necessary for electrical welding and may result in contamination of any weld that is performed with the coating material present. Contaminated welds are often of inferior quality and may not hold up to the flexing encountered during insertion and removal of the flexible screen frame from a window or door structure.

Following welding of the abutted metal core ends it is good practice to clean the area of the weld to remove weld flash or spatter and possibly to mitigate any mushrooming of the abutted ends that may occur during the welding process.

It is also desirable to apply a new polymer coating over the stripped and welded area of the frame to mitigate corrosion and to facilitate adhesion of screen mesh in the area surrounding the weld. This is commonly accomplished by slipping a portion of heat shrink tube over the frame material prior to welding to join the abutting ends and moving the heat shrink material away from the portion to be welded until it is welded, cleaned and cooled. After the welding is performed, post weld cleaned and cooled the heat shrink tube is located to cover the previously stripped and welded portion and heat is applied to shrink it. The level of heat required to shrink the heat shrink tube is considerably less than that related to welding.

These processes are typically manually performed.

Accordingly, there is still room for improvement in the manufacturing of flexible window screens.

SUMMARY

Example embodiments of the invention improve on many of the above discussed deficiencies of the prior art.

According to an example embodiment, the mesh to flexible screen frame laminator generally includes an entry table, a processing table and an exit table.

The entry table includes a horizontal supporting surface and a linear fence against which a flexible screen frame can be aligned. According to an example embodiment the entry table further includes a shrink tube heater adjacent the linear fence. The shrink tube heater may be structured to retract below the horizontal supporting surface and also to extend above the horizontal supporting surface. The entry table is at an elevated height relative to the processing table and the exit table. According to an example embodiment, the entry table may define a cut out into which an operator may step to facilitate the handling of smaller flexible screen frames.

The cut out may be located relatively closer to the junction between the entry table and the processing table.

The shrink tube heater generally includes structure defining a trough into which the shrink tube and flexible screen frame material are received. Within the trough are heating elements. The heat elements may include halogen light and heat sources, electrical resistance heaters or may include a source of heated air for example. The trough is sized and shaped to receive the screen frame material therein with a small amount of clearance.

The processing table generally includes two pairs of heater rollers. At least one of each pair of heater rollers is adjustably horizontally movable relative to the other of the pair of heater rollers to accommodate various sizes of flexible screen frames. Each of heater rollers is further structured to be shiftable between a raised position and a lowered position. In the lowered position, the heater rollers are arranged to pinch flexible screen frame material between and upper roller and a lower roller so that the flexible screen frame material can be driven forward by friction with the heater rollers. The heater rollers may be heated by for example hot air or by electrical resistance. According to another example embodiment, heated air is applied directly to the mesh and the frame to fuse the mesh material through the polymer coating of the screen frame material. Heater rollers are power driven to advance the screen frame from the entry table to the processing table during the heating and fusing process.

The processing table also includes a cradle that is automatically shiftable between a raised position and a lowered position. According to one example embodiment, the raised position of the cradle is generally coplanar with the entry table while the lowered position is generally coplanar with the processing table and the exit table. According to another example embodiment, the cradle is generally coplanar with the entry table in the raised position and is tilted downwardly in the lowered position to permit a flexible screen frame to descend to the level of the processing table and the exit table. According to an example embodiment, the cradle is also shiftable in size along with the pair of heater rollers that is adjacent to the entry table to receive a window frame as it is moved from the entry table to the raised cradle. For the purposes of this application the terms generally coplanar or substantially coplanar mean that the two surfaces or tables are equal in height or coplanar within plus or minus 2.5 centimeters (1 inch.)

The exit table is adjacent to and is of approximately equal height to the processing table. A second pair of driven heater rollers is located proximate the juncture between the processing table and the exit table. These are similar in structure to the first pair of driven heater rollers and are oriented at approximately a 90° angle to the first pair of driven heater rollers. For the purposes of this application, angles that are referred to as approximately, substantially or generally at a particular angle are considered to be at that angle with a tolerance of plus or minus ten degrees. The second pair of driven heater rollers are adjustable as to separation and relative position. The second pair of driven heater rollers are shiftable between a raised position and a lowered position. In the lowered position the second pair of driven heater rollers is arranged to pinch flexible screen frame material and overlying screen mesh to facilitate the fusion of the polymer coating of the flexible screen frame material and the screen mesh applied thereto.

Thus, the first pair of driven heater rollers fused two parallel sides of the flexible window screen frame with the mesh material and the second pair of driven heater rollers fused the other two parallel sides of the flexible window screen frame that are orthogonal to the first parallel sides to create complete fusion of a perimeter of the mesh material with the frame material.

Example embodiments of the invention also include several fences that facilitate keeping the straight sides of the flexible screen frame material rectilinear during processing. These fences include a linear fence and a short fence associated with the entry table as well as a cradle fixed fence and a cradle movable fence associated with the cradle and a further processing table fixed fence and processing table movable fence associated with the processing table. These fences assist in maintaining sides of the flexible screen frame in a straight orientation. It is important for the sides of the screen frame to be maintained straight to allow the flexible screen that is produced to function properly.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
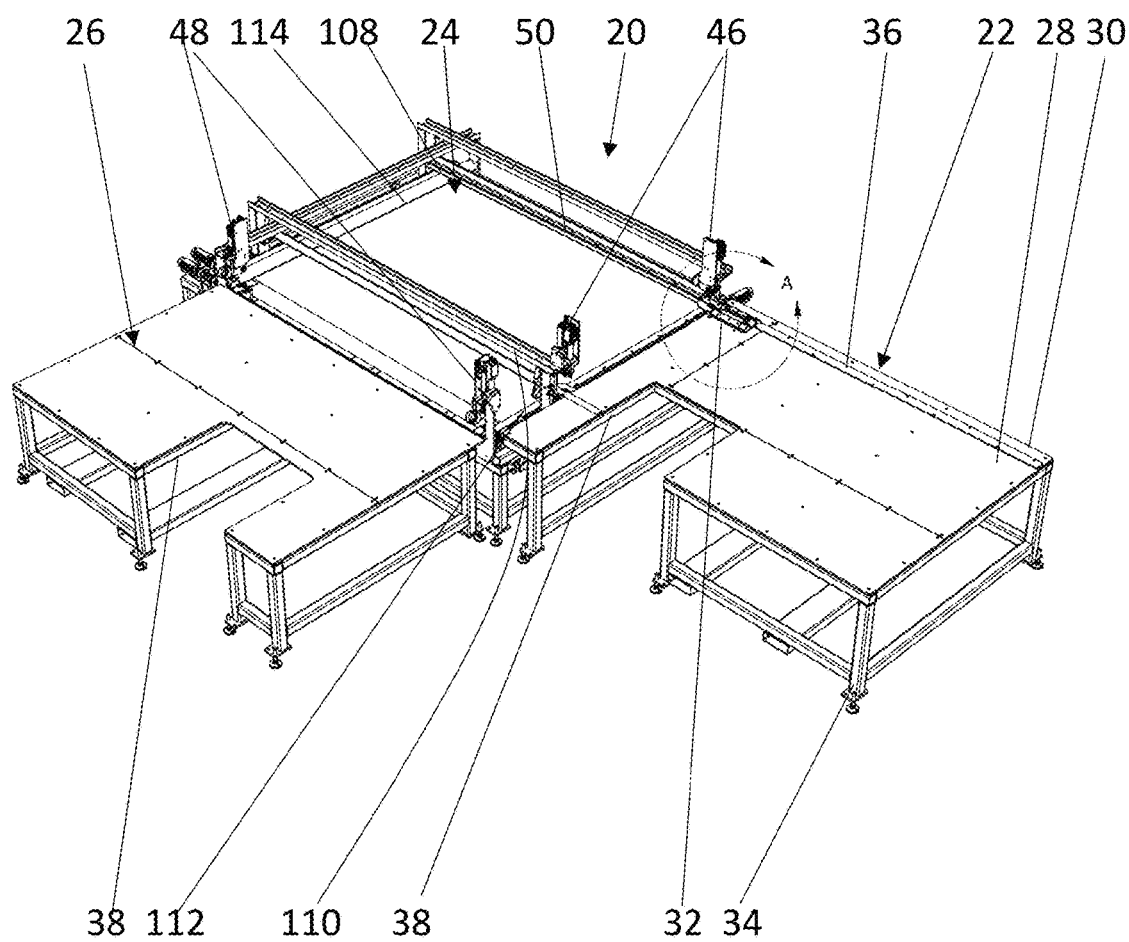
FIG. 1 is a perspective view of a mesh to flexible screen laminator according to an example embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 2:
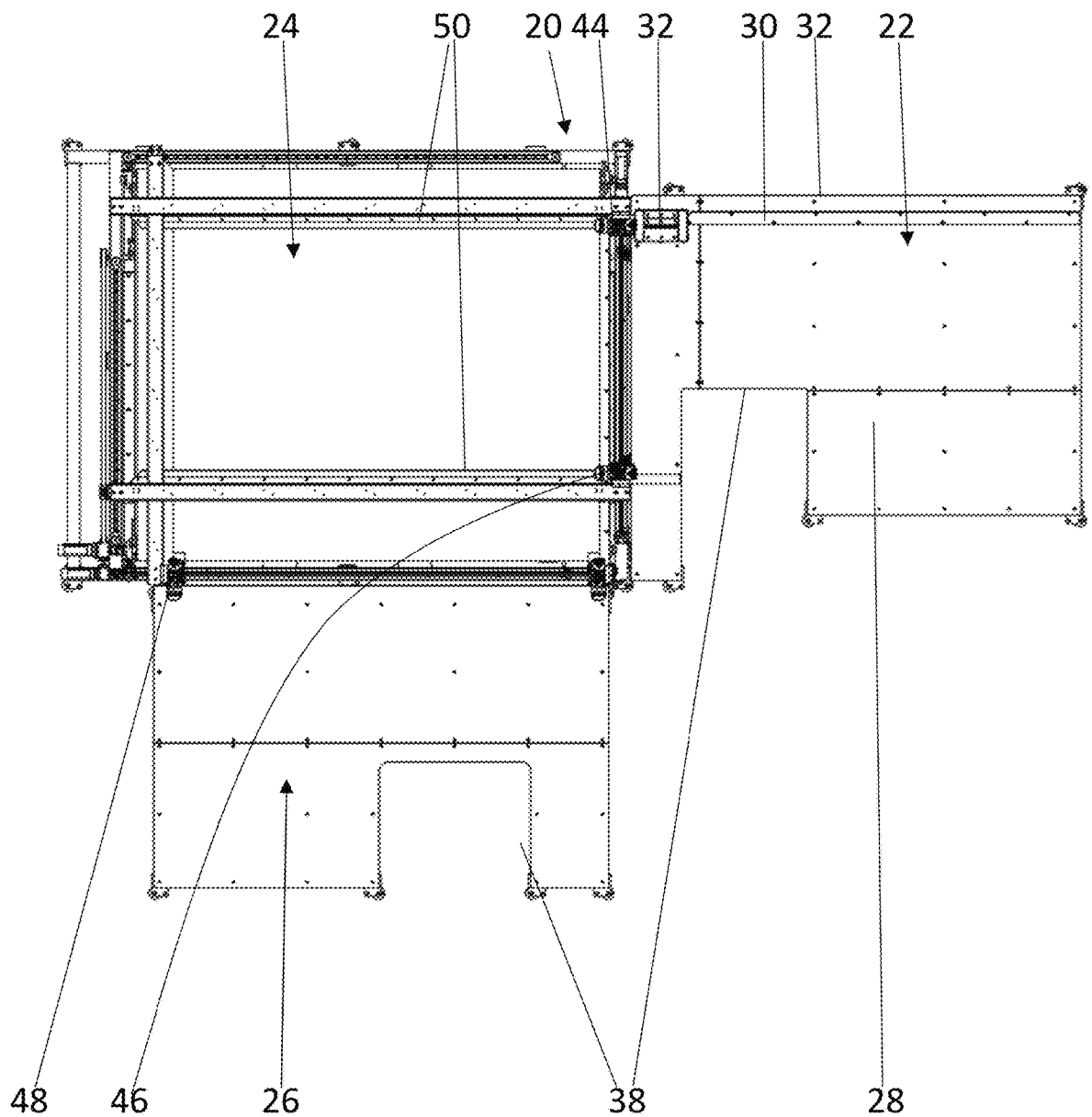
FIG. 2 is a plan view of the mesh to flexible screen frame laminator as depicted in FIG. 1.

Referring particularly to FIGS. 1 and 2, according to an example embodiment, mesh to flexible screen frame laminator 20 generally includes entry table 22, processing table 24 and exit table 26.

Entry table 22 generally includes horizontal supporting surface 28, linear fence 30 and shrink tube heater 32. Horizontal supporting surface 28 is supported by floor engaging legs 34. Linear fence 30 is oriented parallel to perimeter edge 36 of horizontal supporting surface 28.

Shrink tube heater 32 is located adjacent, proximal to and parallel or co-linear with linear fence 30. Horizontal supporting surface 28 of entry table 22 is at an elevated height relative to processing table 24 and exit table 26. According to an example embodiment, entry table 22 may define cut out 38.

Figure 3:
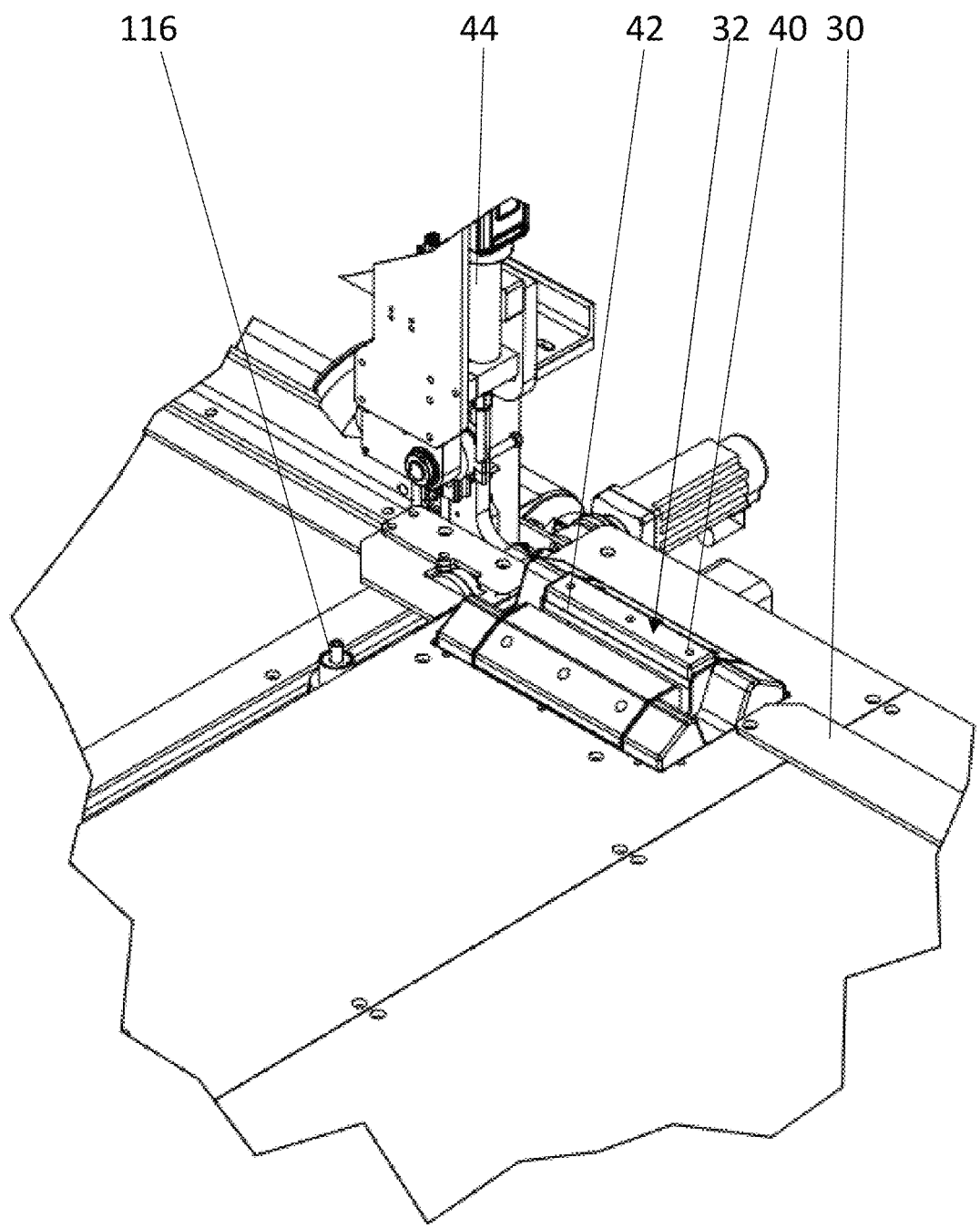
FIG. 3 is a detail perspective view of a shrink tube heater in a raised position according to an example embodiment of the invention.

Referring particularly to FIG. 3, shrink tube heater 32 generally includes heater jaws 40 defining heater trough 42. Trough 42 is appropriately sized to receive screen frame material along with a surrounding shrink tube therein with a small amount of clearance. Shrink tube heater 32 is movable to be extended above horizontal supporting surface 28 and retracted below horizontal supporting surface 28. Shrink tube heater 32 is thus shiftable between an extended position above horizontal supporting surface 28 and a retracted position below horizontal supporting service 28. Shrink tube heater 32 includes halogen lamps (not shown) that emit primarily infrared light to heat shrink tube according to an example embodiment.

Processing table 24 is adjacent to entry table 22 and is lower than entry table 22. Processing table 24 generally includes two pairs of heater rollers 44. First pair of heater rollers 46 is located proximate entry table 22. Second pair of heater rollers 48 is located proximate exit table 26. First pair of heater rollers 46 is oriented at substantially a right angle to second pair of heater rollers 48. First pair of heater rollers 46 may be coupled to processing table 24 or entry table 22 or may be coupled to both tables. First pair of heater rollers 46 is located proximate the juncture between entry table 22 and processing table 24.

Figure 4:
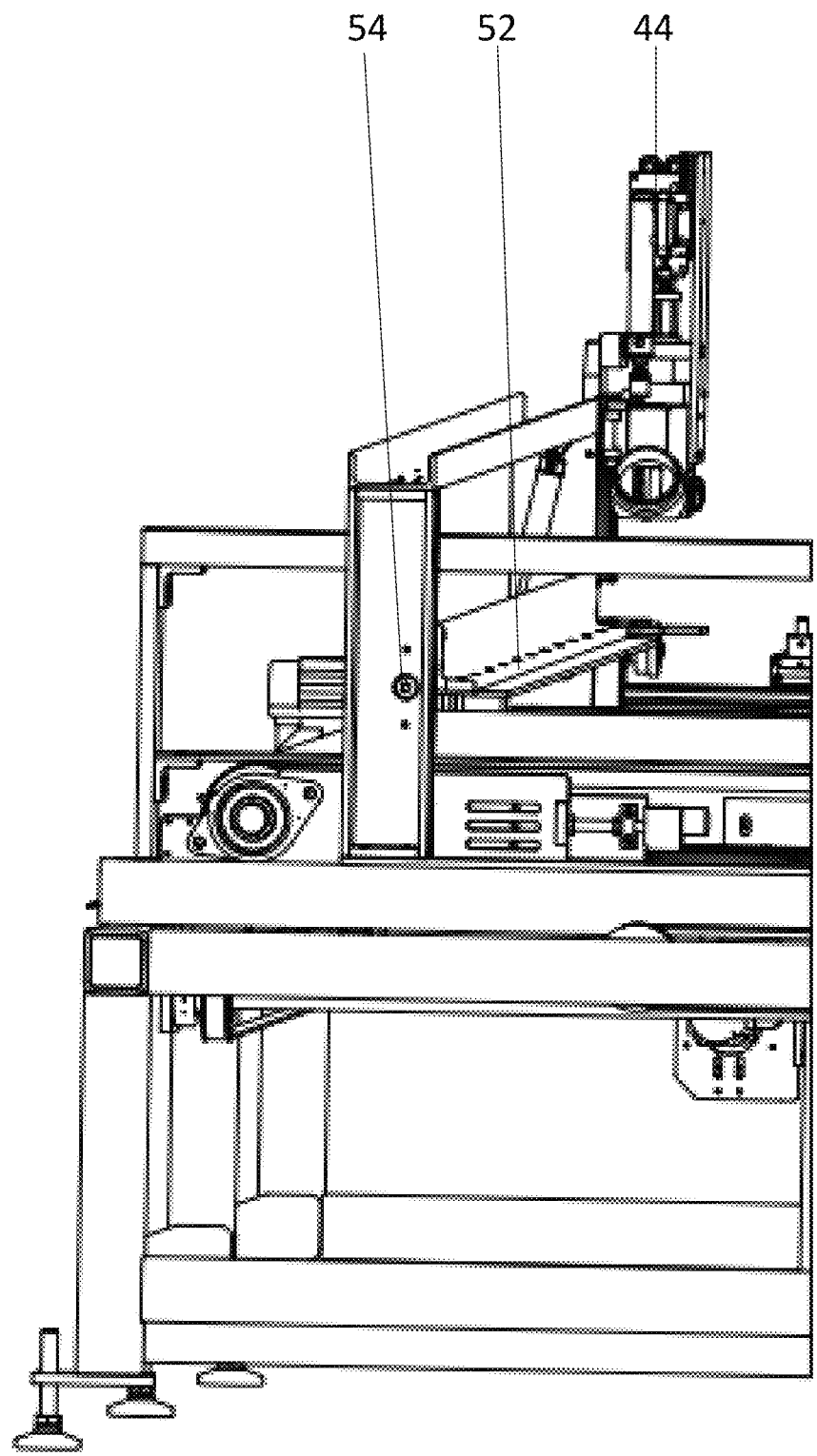
FIG. 4 is an elevational view of a cradle in a raised orientation according to an example embodiment of the invention.
Figure 5:
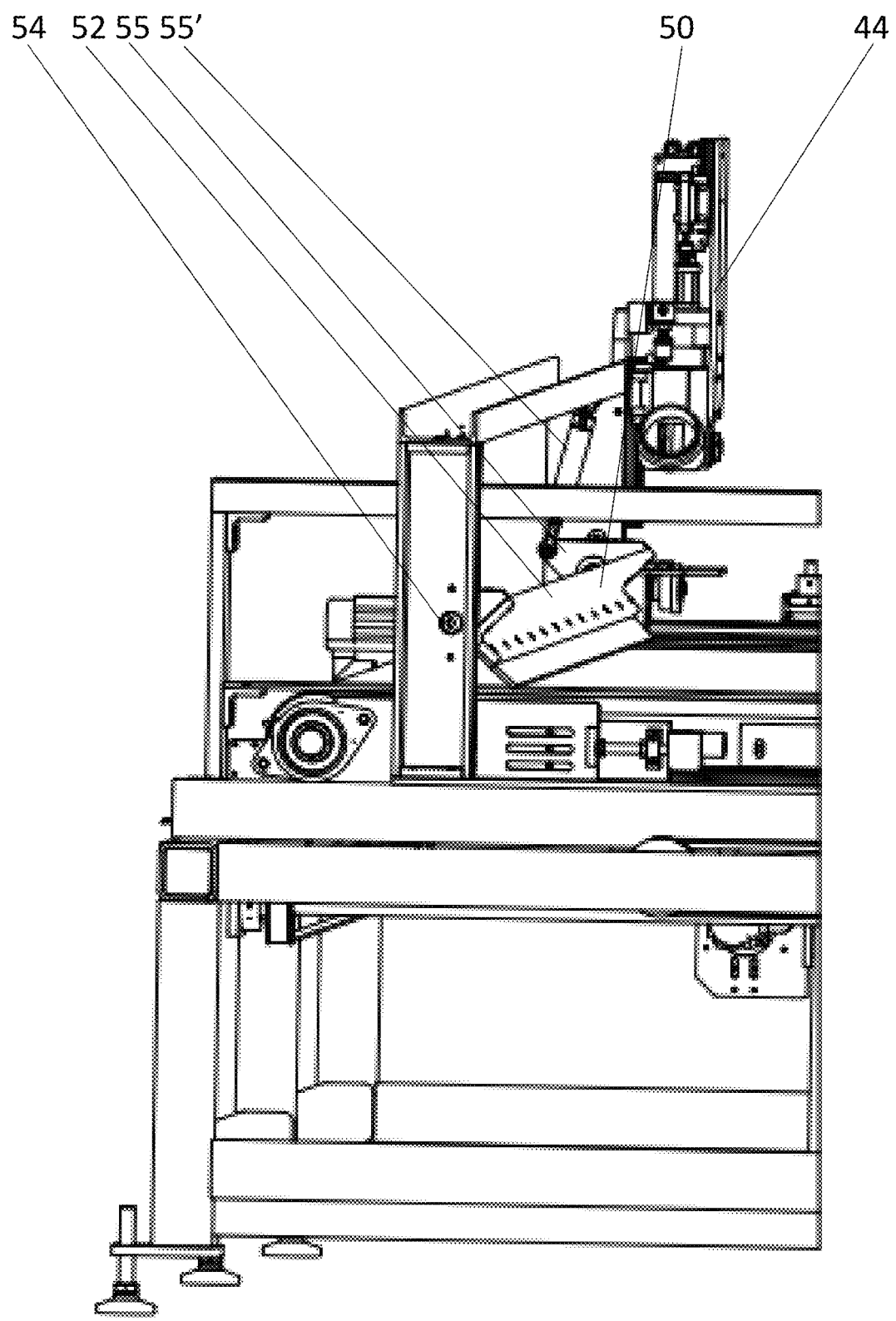
FIG. 5 is an elevational view of the cradle of FIG. 3 in a lowered orientation.

Processing table 24 further includes cradle 50. Cradle 50 is shiftable between a raised position and a lowered position as is depicted in FIGS. 4 and 5. In the depicted example embodiment cradle 50 further includes rotatable angle supports 52 which are rotatable about axle bearings 54. Rotatable angle support 52 further includes bell crank 55 coupled to linear actuator 55' as best seen in FIG. 5. Rotatable angle supports 52 are movably coupled to first pair of heater rollers 46 so that rotatable angle supports 52 are adjustable in width position along with first pair of heater rollers 46. Thus, rotatable angle supports 52 are each always aligned with one of first pair of heater rollers 46.

Figure 6:
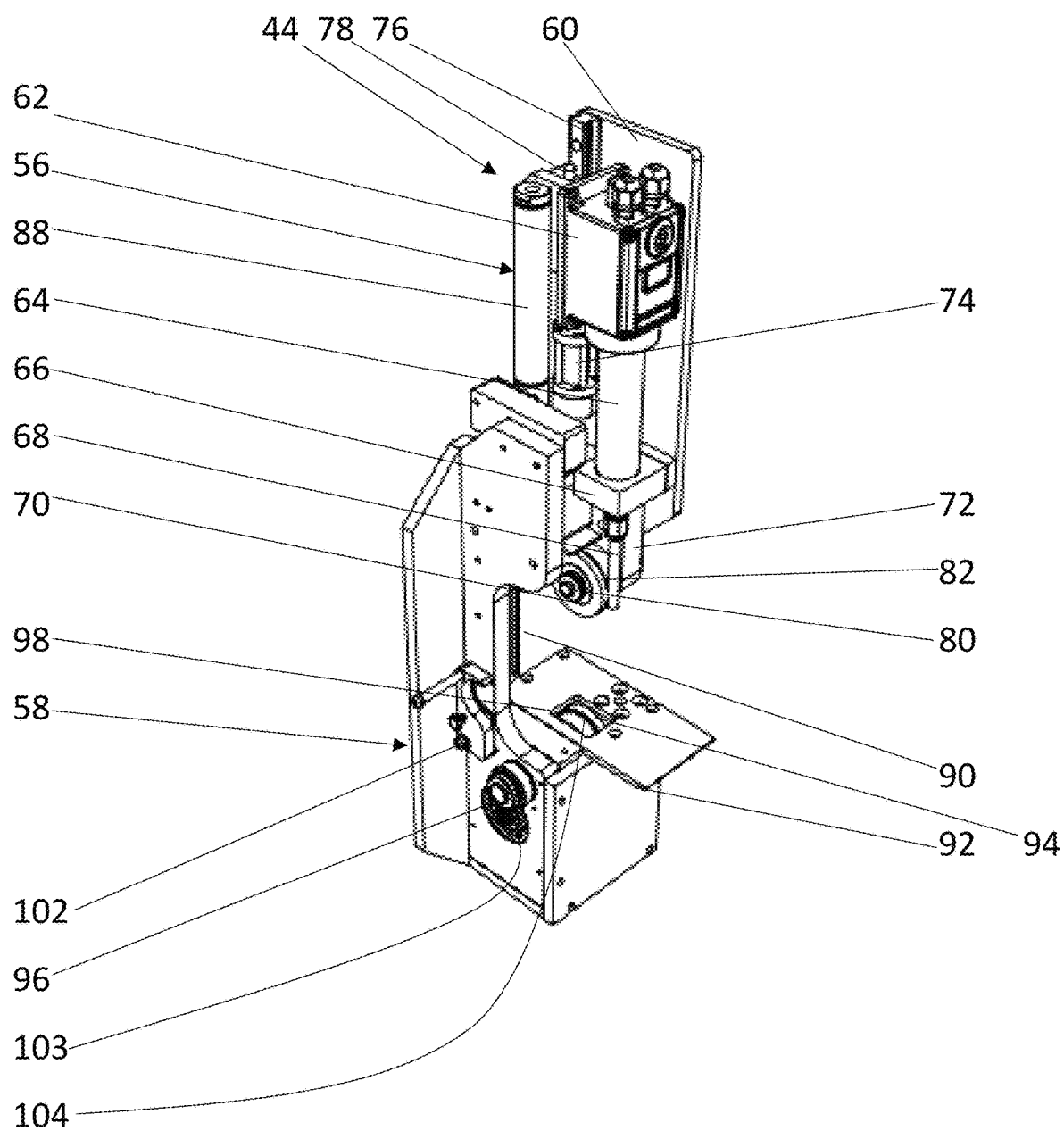
FIG. 6 is a perspective view of a driven heater roller according to an example embodiment of the invention in a raised orientation.
Figure 7:
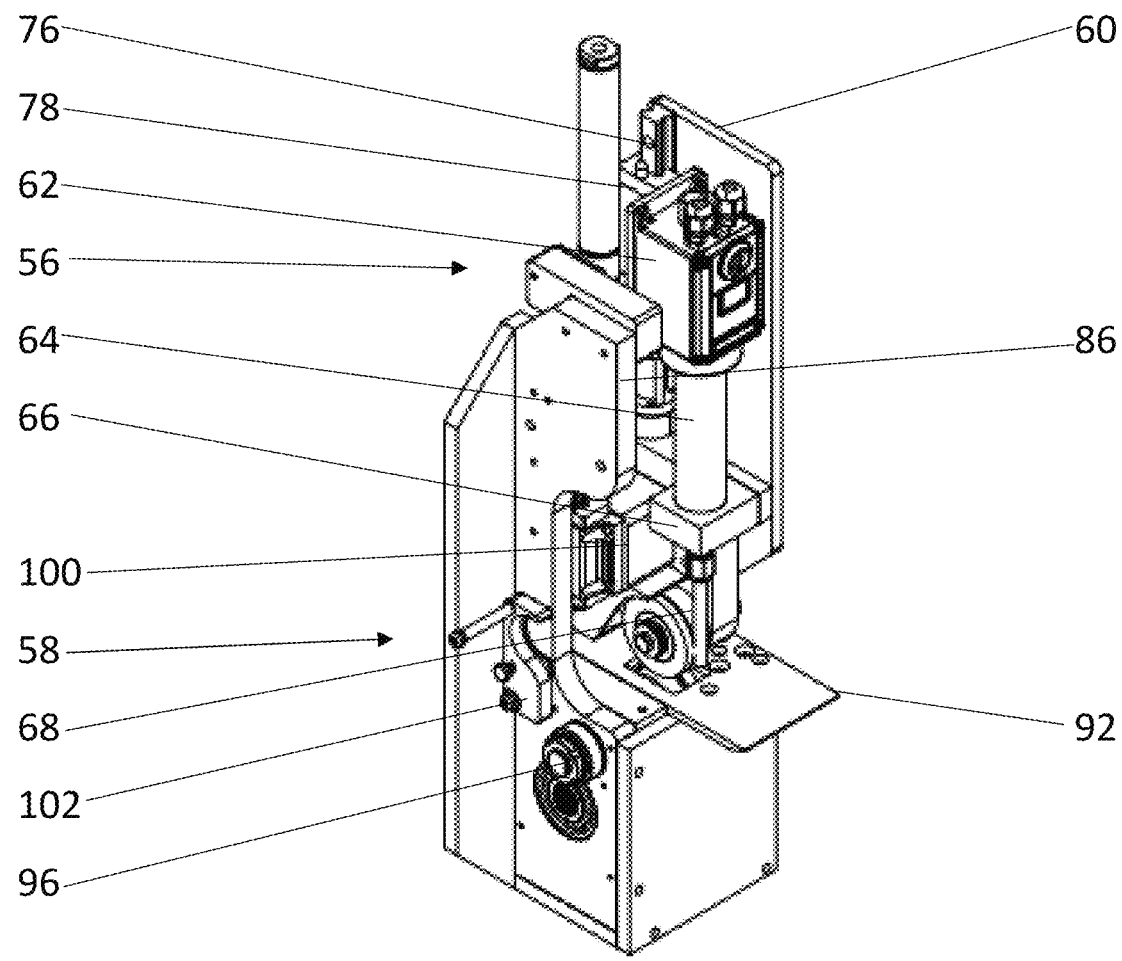
FIG. 7 is a perspective view of the driven heater roller as depicted in FIG. 5 in a lowered orientation.

Referring now particularly to FIG. 6 and FIG. 7, an example heater roller 44 is depicted in a raised orientation and in a lowered orientation. Heater roller 44 generally includes upper portion 56 and lower portion 58. Upper portion 56 is movable relative to fixed lower portion 58.

Upper portion 56 generally includes upper support plate 60, control unit 62, heater tube 64, heater manifold 66, heater nozzle 68, roller wheel 70, roller wheel support 72, heater tube actuator 74, heater track 76 and heater traveler 78.

Control unit 62 is coupled to heater tube 64 which in turn is coupled separably to heater manifold 66. Heater manifold 66 encloses heating elements (not shown). Heater nozzle 68 extends downwardly from heater manifold 66 and terminates in close proximity to roller wheel 70. Heater tube 64 is shiftable between a coupled position relative to heater manifold 66 and an uncoupled position by the operation of heater tube actuator 74. In the uncoupled position heater tube 64 is separated from heater manifold 66 so that heated air from heater tube 64 disperses into the ambient atmosphere. In the coupled position, heater tube 64 is in contact and fluid communication with heater manifold 66 so that heated air passes through heater manifold 66 which in turn is in fluid communication with heater nozzle 68. Heater tube 64 along with control unit 62 are coupled to heater traveler 78 in this example embodiment. Heater traveler 78 is movable vertically along heater track 76 by operation of the heater to actuator 74. Heater manifold 66 is secured to upper support plate 60 as is heater track 76. Heater traveler 78 is movably coupled to heater track 76.

Roller wheel 70 is supported on axle 80 which is supported by roller wheel support 72. Roller wheel support 72 is coupled to upper support plate 60. Roller wheel 70 is freely rotatable on axle 80 and, in the depicted example embodiment, presents concave groove 82 which is shaped to conform to screen frame material that is to be processed. According to another example embodiment, roller wheel 70 maybe tapered in construction.

Lower portion 58 of heater roller 44 generally includes housing 84, upper portion support member 86, vertical actuator 88, upper portion track 90, table plate 92 and lower roller wheel 94.

Housing 84 supports upper portion support member 86 and encloses lower roller wheel 94 partially. Lower roller wheel 94 is driven and rotates on lower axle 96. Lower roller wheel 94 is driven by a motor which is not visible as it is enclosed within housing 84. Lower roller wheel 94 can be concavely grooved according to one example embodiment. Lower roller 94 may also be tapered in construction. Tapered construction of lower roller 94 can be made to complement tapered construction of roller wheel 70 according to an example embodiment of the invention. Either roller wheel 70 or lower roller 94 can be tapered in construction. It is not required that both rollers be tapered in construction. Nor is it required that both rollers be concave in construction.

Table plate 92 is structured to be positioned substantially coplanar with horizontal surface 28 of entry table 22. Table plate 92 presents wheel opening 98 which is sized and shaped to receive lower roller wheel 94 at least partially therethrough. Table plate 92 further partially forms housing 84. Upper portion track 90, most readily visible in FIG. 6, is structured to receive upper portion traveler 100 in slidable relation thereto. Upper portion traveler 100 is most readily visible in FIG. 7. Vertical actuator 88 is operably coupled to upper portion 56 and shifts upper portion 56 between a raised position as depicted in FIG. 6 and a lowered position as depicted in FIG. 7.

Lower roller wheel groove adjuster 102 and axle collar 104 are present on the exterior of housing 84. Lower roller wheel groove adjuster 102 is shiftable between an upright position as depicted and a lowered position in operable interaction with axle collar 103. Interaction of lower roller wheel groove adjuster 102 causes variation in the width of lower roller wheel groove 104.

Figure 8:
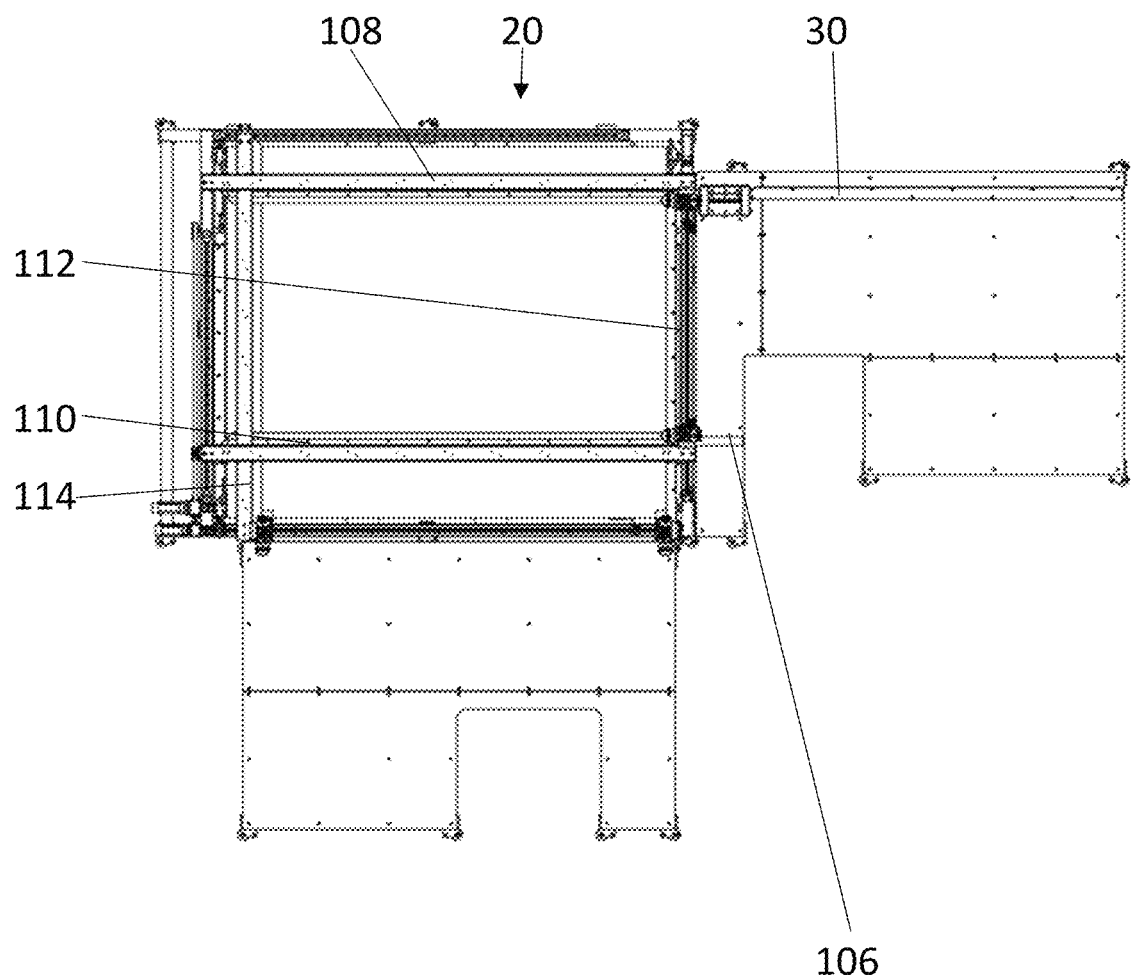
FIG. 8 is a further plan view of the mesh to flexible screen frame laminator as depicted in FIG. 1.

Referring particularly, to FIG. 8, a plan view of mesh to screen frame laminator. In addition to linear fence 30, mesh to screen frame laminator 20 further includes short fence 106, cradle fixed fence 108, cradle movable fence 110, processing table fixed fence 112 and processing table movable fence 114. Short fence 106 extends outwardly away from one of first pair of heater rollers 46 that is remotely located from linear fence 30 and parallel to linear fence 30. Cradle fixed fence 108 is located above processing table 24 and extends generally colinearly with linear fence 30. Cradle movable fence 110 is located on cradle 50 and extends colinearly with short fence 106 and parallel to cradle fixed fence 108. Processing table fixed fence 112 is substantially perpendicular to linear fence 30 and is located proximate entry table 22 on processing table 24. Processing table movable fence 114 is oriented substantially parallel to processing table fixed fence 112 and movable with one of second pair of heater rollers 48.

Referring to FIG. 3, according to an example embodiment, movable, retractable alignment pegs 116 may be located at the juncture between entry table 22 and processing table 24 and at the juncture between processing table 24 and exit table 26. Alignment pegs 116 are vertically extendable and retractable so as to extend above horizontal supporting surface 28 when extended. Alignment pegs 116 may also be extendable and retractable so ask to extend above and retract below surfaces of processing table 24 and exit table 26. Alignment pegs 116 may be horizontally movable to urge a partially finished or finished flexible screen frame with mesh on to a following table. Alignment pegs 116 may also act as a stop for positioning of flexible screen frames.

Figure 9:
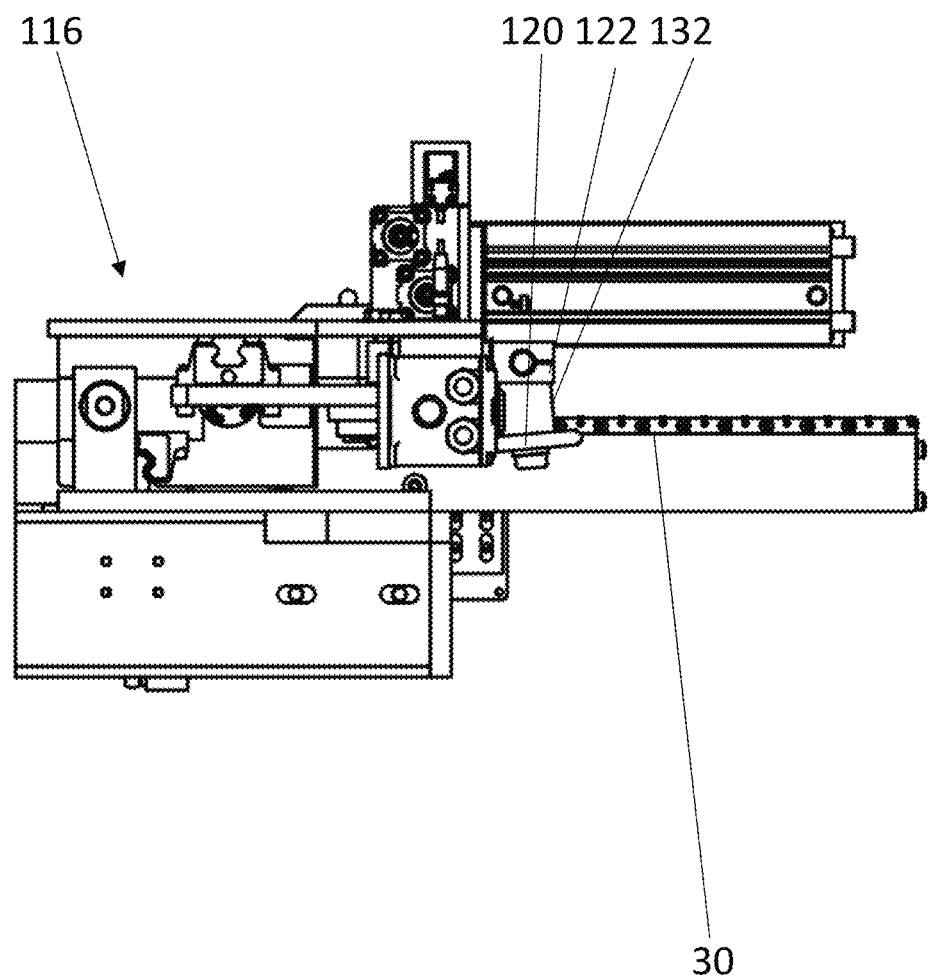
FIG. 9 is a plan view of a driven heater roller assembly according to an alternative example embodiment of the invention.
Figure 10:
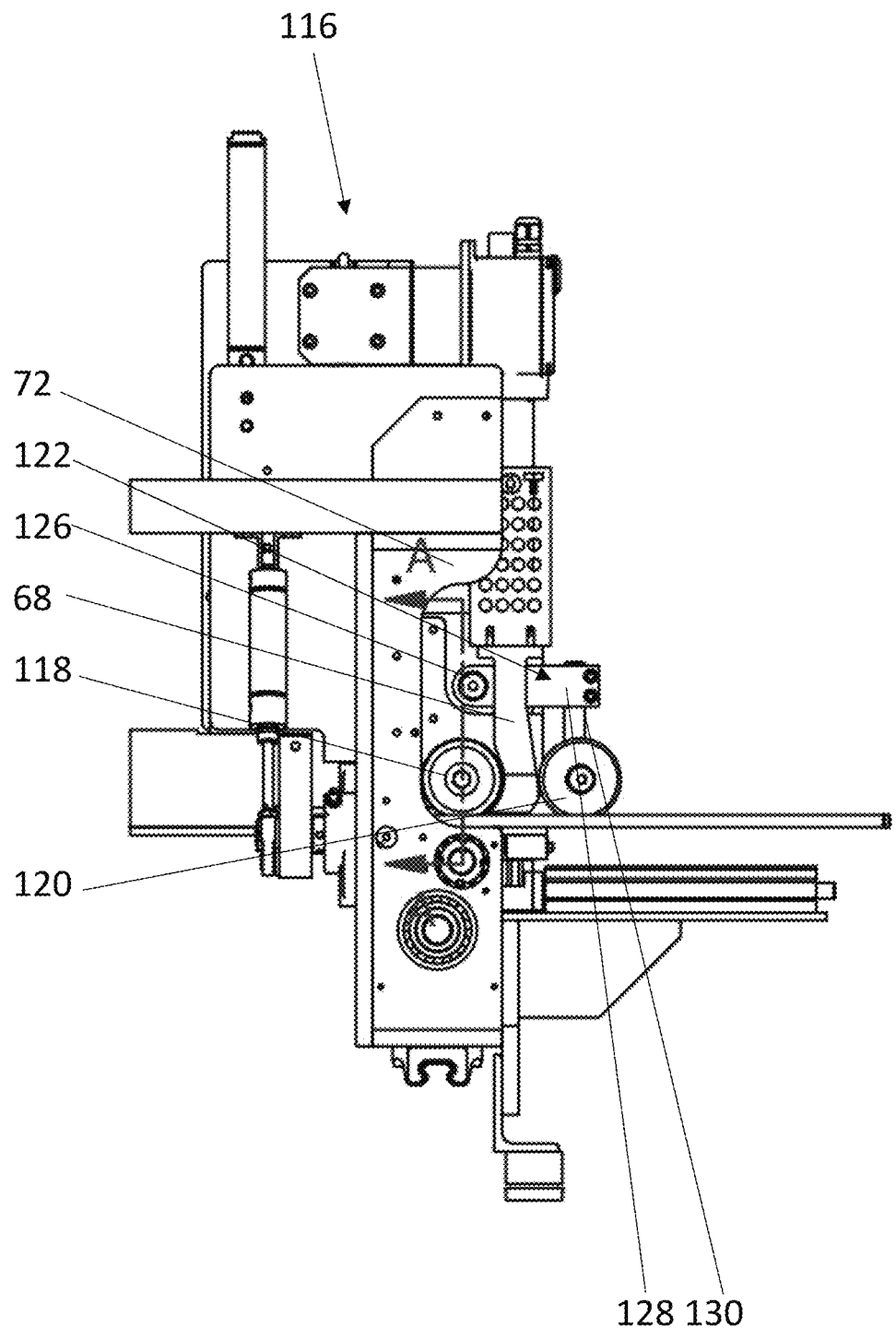
FIG. 10 is a side elevational view of the driven heater roller assembly according to the example embodiment depicted in FIG. 9.
Figure 11:
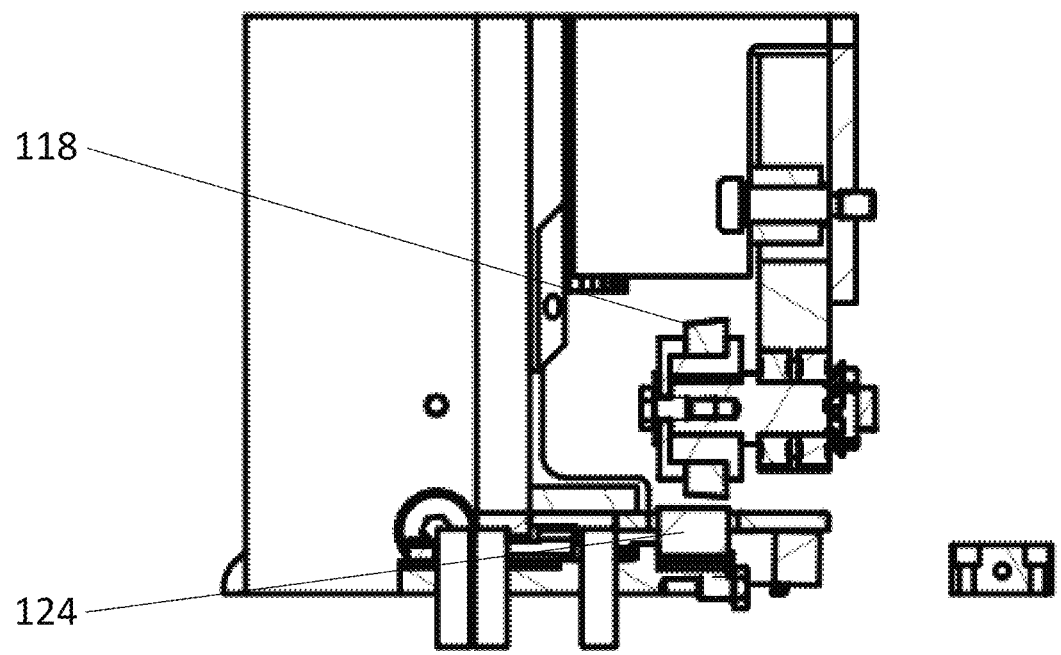
FIG. 11 is a detailed sectional view taken along section line A-A of FIG. 10 depicting a tapered roller according to an example embodiment of the invention.

FIGS. 9, 10 and 11 depict heater roller assembly 44 according to an alternative example embodiment of the structure.

Referring particularly to FIGS. 9 and 10, tapered heater roller assembly 116, in addition to structures previously described, includes tapered roller 118, angled roller 120, angled roller carriage 122 and flat lower roller 124.

Tapered roller 118, best seen in FIG. 11, is tapered in a direction toward linear fence 30. Tapered roller 118 is generally aligned with flat lower roller 124.

Referring particularly to FIG. 9, angled roller 120 is supported by angled roller carriage 122 which is in turn supported by roller wheel support 72. Angled roller carriage 122 further includes axle 126, horizontal supporting member 128, vertical supporting member 130 and angled roller support 132.

In operation, an operator places a flexible screen frame on entry table 22 and aligns the flexible screen frame abutting linear fence 30 and short fence 106. The flexible screen frame is advanced to abut extended alignment pegs 116. A portion of shrink tubing is aligned with a previously stripped portion of flexible screen frame overlying a weld. This portion of the flexible screen frame overlies shrink tube heater 32.

Shrink tube heater 32 may be shifted to an elevated position above horizontal supporting surface 28 before or after the placement of the flexible screen frame. Shrink tubing heater 32 is then energized to apply heat to the shrink tube for example by illuminating halogen lamps. Other heating techniques may also be used. Once the shrink tube is shrunk, shrink tubing heater 32 is then retracted to lie below horizontal supporting surface 28.

A portion of screen mesh is then placed by the operator overlying the flexible screen frame. Alignment pegs 116 are retracted. First pair of heater rollers 46 is activated. Heater tube 64 is engaged to heater manifold 66 so that heated air is directed from heater tube 64 into heater manifold 66 and then to heater nozzle 68 and toward the frame mash and flexible screen frame. Upper portion 56 of heater roller 44 is activated to lower roller wheel 70 toward lower roller wheel 94 with the screen frame mesh and flexible screen frame interposed therebetween. Heat is applied to flexible screen frame and the screen frame mesh via heater nozzle 68 thus raising the plastic material to a temperature at which it is at least partially fluid. The flexible screen frame and screen frame mesh are then moved forward by operation of driven lower roller wheel 94.

Under pressure and application of heated air via heater nozzle 68 screen frame mesh and the flexible screen frame are fused together while being advanced toward and onto cradle 50. This is accomplished on two parallel sides of the flexible screen frame simultaneously. Once this is completed alignment pegs 116 are extended and moved to push the flexible screen frame toward cradle 50. Prior to this first pair of heater rollers 46 are adjusted to be properly spaced to contact parallel sides of the flexible screen frame along with short fence 106. Consequently, the width of cradle 50 is adjusted so that angle supports 52 are also at an appropriate distance to receive the screen frame and mesh. The flexible screen frame with mesh fused to two parallel sides of the flexible screen frame is deposited on cradle 50. Cradle 50 is then shifted from a raised orientation to a lowered orientation by operation of linear actuator 55' and bell cranks 55. This action deposits the flexible screen frame with partially fused mesh on processing table 24.

Second pair of heater rollers 48 are adjusted in width so that they are appropriately spaced to process the two remaining parallel sides of the flexible screen frame by moving cradle movable fence 110 and one of the second pair of heater rollers 48. The flexible screen frame may abut extended alignment pegs 116 at the juncture between processing table 24 and exit table 26. Alignment pegs 116 are then retracted. Second pair of heater rollers 48 is then actuated to pinch the remaining two parallel sides of the flexible screen frame between roller wheels 70 and lower roller wheels 94. Heat and pressure are then applied simultaneously while lower roller wheel 94 drives the flexible screen frame forward in a direction substantially perpendicular to its prior direction of travel. In doing so the flexible screen frame is advanced onto exit table 26 where it may be removed by an operator. Excess screen mesh may then be trimmed off and the fused flexible screen frame with screen mesh is completed.

Referring to FIGS. 9, 10 and 11, when present, tapered heater roller assembly 116 in a lowered position grips screen frame material and screen mesh between tapered roller 118 and flat lower roller 124. Angled roller 120 also presses down on screen frame material and screen mesh while it is driven advanced under heater nozzle 68. Heated air from heater nozzle 68 is directed at and melts screen frame material and screen mesh while it is passed beneath tapered roller 118 and angled roller 120. Angled roller 120 is biased downwardly and pivots about axle 126. Angled roller 120 facilitates alignment and positioning of for screen frame material as does tapered roller 118. The end result is that the resulting screen frame as flexible spring resilient screen frame material rectilinearly aligned to facilitate proper insertion and removal in a window or door frame.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A mesh to flexible screen frame laminator; comprising:
   a first table including a horizontal surface and an alignment fence;
   a second table, adjacent the first table, that is lower than the first table;
   a first pair of selectively driven heater rollers which are shiftable between a raised position and a lowered position relative to the first table;
   a cradle adjacent the first table and above the second table, at least a portion of which is shiftable between a raised position and a lowered position, the raised position being substantially coplanar with the first table;
   a second pair of selectively driven heater rollers which are shiftable between a raised position and a lowered position relative to the second table and which are oriented transversely to the first pair of heater rollers; and
   a third table adjacent the second table and at a height substantially coplanar with the second table.

2. The mesh to flexible screen frame laminator as claimed in claim 1, further comprising a shrink tube heater.

3. The mesh to flexible screen frame laminator as claimed in claim 2, wherein the shrink tube heater is located proximate the alignment fence, wherein the shrink tube heater is shiftable between a retracted position and an extended position relative to the first table or wherein the shrink tube heater is both located proximate the alignment fence and shiftable between a retracted position and an extended position relative to the first table.

4. The mesh to flexible screen frame laminator as claimed in claim 1, further comprising a processing table fixed fence extending substantially perpendicular to the alignment fence and located proximate a juncture between the first table and the second table and a processing table movable fence that is movable relative to the processing table fixed fence and extends substantially parallel to the processing table fixed fence.

5. The mesh to flexible screen frame laminator as claimed in claim 4, wherein the processing table movable fence is operably coupled to one of the second pair of heater rollers and movable therewith.

6. The mesh to flexible screen frame laminator as claimed in claim 1, wherein the cradle includes a first angle support and a second angle support and the first angle support is horizontally fixed in location and aligned relative to the alignment fence and one of the first pair of selectively driven heater rollers, and the second angle support is horizontally moveable in combination with the other of the first pair of selectively driven heater rollers.

7. The mesh to flexible screen frame laminator as claimed in claim 1, wherein at least one of an upper roller and a lower roller of each of the first pair of selectively driven heater rollers is concave and a concavity of the roller accommodates a shape of flexible screen frame material to be processed by the flexible screen frame laminator or wherein at least one of the upper roller and the lower roller is tapered.

8. The mesh to flexible screen frame laminator as claimed in claim 1, wherein at least one of the selectively driven heater rollers further comprises an upper roller member and a lower roller member and when the at least one of the selectively driven heater rollers is in the lowered position the upper roller member and the lower roller are proximate each other or further comprising an angled roller.

9. The mesh to flexible screen frame laminator as claimed in claim 1, wherein the cradle includes a first angle support and a second angle support and wherein each of the first angle support and the second angle support includes a horizontal portion and wherein at least one of the first angle support and the second angle support is rotatable about an axis such that at least one of the horizontal portion of the first angle support or the horizontal portion of the second angle support is angled downwardly when the cradle is in the lowered position.

10. The mesh to flexible screen frame laminator as claimed in claim 1, wherein at least one of the heater rollers further comprises an upper portion including a heater tube and a heater manifold; wherein the heater tube and the heater manifold are separable from each other such that when the heater tube and the heater manifold are unseparated the heater tube and the heater manifold are in fluid communication such that heated air from the heater tube flows into the heater manifold and when the heater tube and the heater manifold are separated heated air is directed to ambient atmosphere.

11. The mesh to flexible screen frame laminator as claimed in claim 1, further comprising a short fence extending outward away from at least one of the first pair of heater rollers over the first table and extending substantially parallel to the alignment fence and being movable relative to the alignment fence.

12. A method of welding mesh to a flexible screen frame; comprising:
placing the flexible screen frame on a first table including a horizontal surface and an alignment fence with the flexible screen frame abutting the alignment fence;
placing a portion of mesh overlying the flexible screen frame;
fusing the mesh to the screen frame on two parallel sides by operation of a first pair of selectively driven heater rollers which are shiftable between a raised position and a lowered position relative to the first table while transferring the mesh and the flexible screen frame to a second table, adjacent the first table, that is lower than the first table;
utilizing a cradle adjacent the first table and above the second table, to transfer the flexible screen frame and mesh to the second table by shifting the cradle between a raised position and a lowered position, the raised position being substantially coplanar with the first table; and
using a second pair of selectively driven heater rollers which are shiftable between a raised position and a lowered position relative to the second table and which are oriented transversely to the first pair of heater rollers to fuse the mesh to two remaining parallel sides of the flexible screen frame while transferring the mesh and the flexible screen frame to a third table adjacent the second table and at a height substantially coplanar with the second table.

13. The method as claimed in claim 12, further comprising applying a shrink tube heater to the flexible screen frame to heat and shrink a portion of shrink tube.

14. The method as claimed in claim 12, further comprising retracting a shrink tube heater below a surface of the first table following use and extending the shrink tube heater from below the surface of the first table prior to use.

15. The method as claimed in claim 12, further comprising transferring the flexible screen frame and the mesh from the cradle to the second table by shifting the cradle between a raised position and a lowered position by rotating at least one of a first angle support and a second angle support about an axis such that a portion of the first angle support or the second angle support that is horizontal in the raised position is angled downwardly in the lowered position.

16. The method as claimed in claim 12, further comprising gripping the flexible screen frame and the mesh between an upper roller and a lower roller of each of the first pair of selectively driven heater rollers in a concavity of the roller that accommodates a shape of flexible screen frame material to be processed by the flexible screen frame laminator.

17. The method as claimed in claim 12, further comprising abutting the flexible screen frame against at least one retractable, extendable alignment peg proximate at least one of a juncture between the first table and the second table and a juncture between the second table and the third table or moving the at least one retractable, extendable alignment peg.

18. The method as claimed in claim 12, further comprising engaging a heater tube to a heater manifold to direct heated air into the heater manifold and then via a heater nozzle to screen frame material of the flexible screen frame and mesh and disengaging the heater tube from the heater manifold to direct heated air from the heater tube to ambient atmosphere.

19. The method as claimed in claim 12, further comprising movably engaging a short fence with the flexible screen frame, the short fence extending outward away from at least one of the first pair of heater rollers over the first table and extending substantially parallel to the alignment fence.

20. The method as claimed in claim 12, further comprising movably engaging a processing table movable fence with the flexible screen frame, the processing table movable fence being movable relative to a processing table fixed fence to align the flexible screen frame with the processing table fixed fence that extends substantially perpendicular to the alignment fence and that is located proximate a juncture between the first table and the second table.

* * * * *